US009981381B1

(12) United States Patent
Nagarajan

(10) Patent No.: US 9,981,381 B1
(45) Date of Patent: May 29, 2018

(54) REAL TIME GENERATION OF PHASE SYNCHRONIZED TRAJECTORIES

(71) Applicant: X DEVELOPMENT LLC, Mountain View, CA (US)

(72) Inventor: Umashankar Nagarajan, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 36 days.

(21) Appl. No.: 15/177,314

(22) Filed: Jun. 8, 2016

(51) Int. Cl.
*G05B 19/04* (2006.01)
*G05B 19/18* (2006.01)
*B25J 9/16* (2006.01)

(52) U.S. Cl.
CPC ................... *B25J 9/1664* (2013.01)

(58) Field of Classification Search
CPC ........................................ B25J 9/1664
USPC .......................................... 700/250
See application file for complete search history.

(56) References Cited

U.S. PATENT DOCUMENTS

| 6,580,245 | B2 | 6/2003 | Quaschner et al. | |
|---|---|---|---|---|
| 8,457,830 | B2* | 6/2013 | Goulding | B62D 57/024 318/568.11 |
| 9,095,977 | B2* | 8/2015 | Yamamoto | B25J 9/1664 |
| 9,649,765 | B2* | 5/2017 | Frische | B25J 9/1664 |
| 2012/0277907 | A1* | 11/2012 | Kim | B25J 9/1664 700/245 |
| 2012/0296471 | A1* | 11/2012 | Inaba | B25J 9/163 700/253 |
| 2014/0012419 | A1* | 1/2014 | Nakajima | B25J 9/1633 700/261 |
| 2014/0297030 | A1* | 10/2014 | Iwasaki | G05B 19/416 700/245 |
| 2014/0297031 | A1* | 10/2014 | Iwasaki | B25J 9/1664 700/245 |
| 2015/0025684 | A1* | 1/2015 | Negishi | B25J 9/1664 700/261 |

(Continued)

OTHER PUBLICATIONS

Haschke, Robert, Erik Weitnauer, and Helge Ritter. "On-line planning of time-optimal, jerk-limited trajectories." In Intelligent Robots and Systems, 2008. IROS 2008. IEEE/RSJ International Conference on, pp. 3248-3251 IEEE, 2008. Jan. 1, 2008.

(Continued)

*Primary Examiner* — Harry Y Oh
(74) *Attorney, Agent, or Firm* — Middleton Reutlinger

(57) ABSTRACT

Methods, apparatus, systems, and computer readable media are provided for generating phase synchronized trajectories for actuators of a robot to enable the actuators of the robot to transition from a current motion state to a target motion state. Phase synchronized trajectories produce motion of a reference point of the robot in a one-dimensional straight line in a multi-dimensional space. For example, phase synchronized trajectories of a plurality of actuators that control the movement of an end effector may cause a reference point of the end effector to move in a straight line in Cartesian space. In some implementations, phase synchronized trajectories may be generated and utilized even when those phase synchronized trajectories are less time-optimal than one or more other non-phase synchronized trajectories.

15 Claims, 5 Drawing Sheets

(56) References Cited

U.S. PATENT DOCUMENTS

2016/0031082 A1* 2/2016 Hazan .................... B25J 9/1661
                                                          700/250
2016/0082598 A1* 3/2016 Anducas Aregall ... B25J 19/022
                                                          382/153
2016/0258758 A1* 9/2016 Houston ................ G01C 21/20

OTHER PUBLICATIONS

Kröger, Torsten, Adam Tomiczek, and Friedrich M. Wahl. "Towards on-line trajectory computation." In Intelligent Robots and Systems, 2006 IEEE/RSJ International Conference on, pp. 736-741. IEEE, 2006 Jan. 1, 2006.

Kröger, Torsten. "Online trajectory generation: straight-line trajectories." Robotics, IEEE Transactions on 27, No. (2011): 1010-1016 Jan. 1, 2011.

Lambrechts, Paul, Matthijs Boerlage, and Maarten Steinbuch. "Trajectory planning and feedforward design for electromechanical motion systems." Control Engineering Practice 13, No. 2 (2005): 145-157 Jan. 1, 2005.

* cited by examiner

REAL TIME GENERATION OF PHASE SYNCHRONIZED TRAJECTORIES

BACKGROUND

Robots may perform a variety of tasks during which end effectors or other components of the robots must move to perform the tasks. For example, to retrieve an object and place the object in a container, an end effector of a robot must move from a current location to a pick up location for the object, then after picking up the object must move again to reach a location for placing the object in the container. A trajectory of the end effector during the movement defines the progression over time of motion states (e.g., position, velocity, acceleration, and/or jerk) of the end effector. Moreover, the trajectory of the end effector during the movement is dictated by the trajectories of actuators of the robot that control the movement of the end effector. Accordingly, the trajectory of the end effector during a movement is dictated by the progression over time of position, velocity, acceleration, and jerk of each of the actuators that control the movement of the end effector.

Various techniques may be employed for determining one or more trajectories to be followed by a robot in performance of a task. For example, some robots may employ a non-real-time trajectory optimizer to determine a trajectory of an end effector. For instance, gradient optimization techniques may be utilized such as techniques that first find a feasible trajectory that satisfies a set of constraints, then iteratively optimize the feasible trajectory to remove redundant and/or "jerky" motion and/or in view of other optimization parameters. Also, for example, some robots may employ real time trajectory generation techniques that enable trajectories for actuators to be generated in real time (e.g., within a control cycle of a robot), while taking into consideration kinematic motion constraints of the robots and while enabling real time adjustment to the trajectories in response to sensor events, in response to a change to a target state of motion, and/or in response to other considerations.

However, robots configured to automatically determine trajectories may suffer from one or more drawbacks. For example, non-real time trajectory optimization techniques may not be applicable to scenarios where real-time trajectory generation is desirable and/or necessary, and/or some non-real time trajectory optimization techniques may not enable generation of a phase synchronized trajectory. Also, for example, some real-time trajectory generation techniques may not enable generation of phase synchronized trajectories, or may only enable generation of phase synchronized trajectories when those trajectories are also time-optimal (i.e., only when those trajectories are as time-optimal as time-optimal trajectories that are time synchronized but not phase synchronized). Additional and/or alternative drawbacks of these and/or other techniques may be presented.

SUMMARY

The present disclosure is generally directed to methods and apparatus for generating phase synchronized trajectories for actuators of a robot to enable the actuators of the robot to transition from a current motion state to a target motion state. Phase synchronized trajectories produce motion of a reference point of the robot in a one-dimensional straight line in a multi-dimensional space (e.g., Cartesian space). For example, phase synchronized trajectories of a plurality of actuators that control the movement of an end effector may cause a reference point of the end effector to move in a straight line in Cartesian space. Phase synchronized trajectories of a plurality of actuators are trajectories that have the same phase across all of those actuators.

In some implementations described herein, phase synchronized trajectories may be generated and utilized even when those phase synchronized trajectories are less time-optimal than one or more other non-phase synchronized trajectories. In some of those implementations, it may first be determined that phase synchronization of time-optimal trajectories is not achievable (e.g., it would violate one or more kinematic motion constraints)—and in response to determining phase synchronization of time-optimal trajectories is not achievable, phase synchronized trajectories that are less time-optimal than the time-optimal trajectories may be generated and/or utilized in lieu of the time-optimal trajectories. In some versions of those implementations, phase synchronized trajectories that are less time-optimal than the time-optimal trajectories may be generated and/or utilized in lieu of the time-optimal trajectories only when a request and/or other signal(s) (e.g., from a motion planner) indicate that phase synchronization is desired or necessary.

In some implementations, time-optimal trajectories may be generated and utilized at least in part in generating phase synchronized trajectories that are not time-optimal. For example, a time-optimal trajectory may be generated for each of a plurality of actuators of a robot, where the time-optimal trajectories time-optimally transfer a current motion state of the actuators to a target motion state of the actuators. For instance, a real time online trajectory generation technique may be utilized to generate the time-optimal trajectories based on the current motion state, the target motion state, and kinematic motion constraints of the actuators (e.g., velocity constraint(s), acceleration constraint(s), jerk constraint(s), and/or torque constraint(s)). In some of those implementations, phase synchronized trajectories may be generated based on: time-scaling the time-optimal trajectory for a given one of the actuators of the robot to generate a time-scaled trajectory (i.e., time scaling the time-optimal trajectory with the largest execution time); phase-scaling the time-scaled trajectory for each of the other actuators of the robot based on phase scale factors of the other actuators to generate phase synchronized trajectories of the other actuators; and using the time-scaled trajectory of the actuator and the phase synchronized trajectories of the other actuators as the phase synchronized trajectories.

Regardless of the particular technique(s) utilized to generate phase synchronized trajectories, the phase synchronized trajectories may be provided for operating the actuators of the robot. For example, the phase synchronized trajectories may be provided to one or more low level controllers for generating control commands based on the phased synchronized trajectories and providing those control commands to drivers associated with corresponding actuators.

In some implementations, a method implemented by one or more processors may be provided that includes identifying a target motion state of a plurality of actuators of the robot and generating, for each of the actuators, a time-optimal trajectory that defines motion states for the actuator. The time-optimal trajectories time-optimally transfer a current motion state of the actuators to the target motion state of the actuators, and generating the time-optimal trajectories is based on: a current motion state of the actuators, the target motion state, and kinematic motion constraints of the actuators. The method further includes: determining that time-optimal phase synchronization of the time-optimal trajectories is not achievable; in response to determining that the time-optimal phase synchronization is not achievable, time-scaling the time-optimal trajectory with the largest execution time to create a time-scaled trajectory; determining, for each of the actuators that are in addition to the actuator having the time-optimal trajectory with the largest execution time, a phase scale factor; and generating, for each of the actuators that are in addition to the actuator having the time-optimal trajectory with the largest execution time, a phase synchronized trajectory. Generating the phase synchronized trajectory for a given actuator is based on phase-scaling the time-scaled trajectory for the given actuator based on the phase scale factor for the given actuator. The method further includes providing the time-scaled trajectory and the phase synchronized trajectories for operating the actuators of the robot.

This method and other implementations of technology disclosed herein may each optionally include one or more of the following features.

In some implementations, determining that the time-optimal phase synchronization is not achievable includes determining that the time-optimal trajectories cannot be phase synchronized while maintaining the time-optimality of the time-optimal trajectories and while avoiding violation of any of the kinematic motion constraints. In some of those implementations, determining that the time-optimal trajectories cannot be phase synchronized while maintaining the time-optimality of the time-optimal trajectories and while avoiding violation of any of the kinematic motion constraints includes: generating, for at least the given actuator that is in addition to the actuator having the time-optimal trajectory with the largest execution time, a candidate phase synchronized trajectory based on the time-optimal trajectory with the largest execution time and based on the phase scale factor; and determining that the candidate phase synchronized trajectory includes a violation of at least one of the kinematic motion constraints. In various implementations, time-scaling the time-optimal trajectory with the largest execution time includes determining a time-scale factor based on at least one property of the violation. In some of those implementations, the at least one property includes a magnitude of the violation and/or includes which of the kinematic motion constraints was violated.

In some implementations, the method further includes generating control commands based on the trajectory and the phase synchronized trajectories, and providing the control commands to drivers associated with the actuators for operating of the actuators of the robot based on the time-scaled trajectory and the phase synchronized trajectories.

In some implementations, the method further includes receiving a request for phase synchronization in reaching the target motion state of the actuators, and time-scaling the time-optimal trajectory with the largest execution time to create the time-scaled trajectory is further in response to identifying the request for phase synchronization. In some of those implementations, the target motion state is received from a motion planner of the robot and the request for phase synchronization is received from the motion planner.

In some implementations, a method implemented by one or more processors may be provided that includes: identifying, at a first time, a first target motion state of a plurality of actuators of the robot; generating, for each of the actuators, a first time-optimal trajectory, wherein the first time-optimal trajectories time-optimally transfer motion state of the actuators at the first time to the first target motion state of the actuators; generating time-optimal phase synchronized trajectories that are a time-optimal phase synchronization of the time-optimal trajectories; providing the time-optimal phase synchronized trajectories for operating the actuators of the robot in reaching the first target motion state from the motion state of the actuators at the first time. The method further includes: identifying, at a second time, a second target motion state of the actuators of the robot; generating, for each of the actuators, a second time-optimal trajectory, wherein the second time-optimal trajectories time-optimally transfer current motion state of the actuators at the second time to the second target motion state of the actuators; determining that time-optimal phase synchronization for the second time-optimal trajectories is not achievable; in response to determining that time-optimal phase synchronization for the second time-optimal trajectories is not achievable, generating phase synchronized trajectories for the actuators that are less time-optimal than the second time-optimal trajectories; and providing the phase synchronized trajectories for operating the actuators of the robot in reaching the second target motion state from the motion state of the actuators at the second time.

This method and other implementations of technology disclosed herein may each optionally include one or more of the following features.

In some implementations, the method further includes receiving a request for phase synchronization in reaching the second target motion state of the actuators and generating phase synchronized trajectories for the actuators that are less time-optimal than the second time-optimal trajectories is further in response to identifying the request for phase synchronization. In some of those implementations, the target motion state is received from a motion planner of the robot and the request for phase synchronization is received from the motion planner.

In some implementations, generating phase synchronized trajectories for the actuators that are less time-optimal than the second time-optimal trajectories includes: time-scaling the second time-optimal trajectory with the largest execution time to create a time-scaled trajectory; using the time-scaled trajectory as the phase synchronized trajectory for the actuator having the time-optimal trajectory with the largest execution time; and generating, for each of the actuators that are in addition to the actuator having the time-optimal trajectory with the largest execution time, the phase synchronized trajectories based on phase scaling the time-scaled trajectory to the actuators based on phase scale factors for the actuators.

In some implementations, determining that the time-optimal phase synchronization for the second time-optimal trajectories is not achievable includes determining that the second time-optimal trajectories cannot be phase synchronized while maintaining the time-optimality of the time-optimal trajectories and while avoiding violation of any kinematic motion constraints of the actuators.

Other implementations may include one or more non-transitory computer readable storage media storing instructions executable by one or more processors to perform a method such as one or more of the methods described above. Yet another implementation may include a robot and/or robotic control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates positions traversed by the reference point of the end effector based on additional phase synchronized trajectories of the actuators and also illustrates two poses of a set of poses struck by the robot based on the trajectories.

DETAILED DESCRIPTION

As used herein, a trajectory of a component defines one or more motion states (e.g., position, velocity, acceleration, and/or jerk) of the component over time. A trajectory of an end effector of a robot is dictated by the trajectories of actuators of the robot that control the movement of the end effector. Accordingly, the trajectory of the end effector is dictated by the progression over time of position, velocity, acceleration, and jerk of each of the actuators that control the movement of the end effector.

The present disclosure is generally directed to methods and apparatus for generating phase synchronized trajectories for actuators of a robot to enable the actuators of the robot to transition from a current motion state to a target motion state. Phase synchronized trajectories of a plurality of actuators produce motion of a reference point (whose motion is controlled by those actuators), where that motion is in a one-dimensional straight line in a multi-dimensional space. For example, phase synchronized trajectories of a plurality of actuators that control the movement of an end effector may cause a reference point of the end effector to move in a straight line in Cartesian space. Phase synchronized trajectories of a plurality of actuators are trajectories that have the same phase across all of those actuators.

Figure 1:
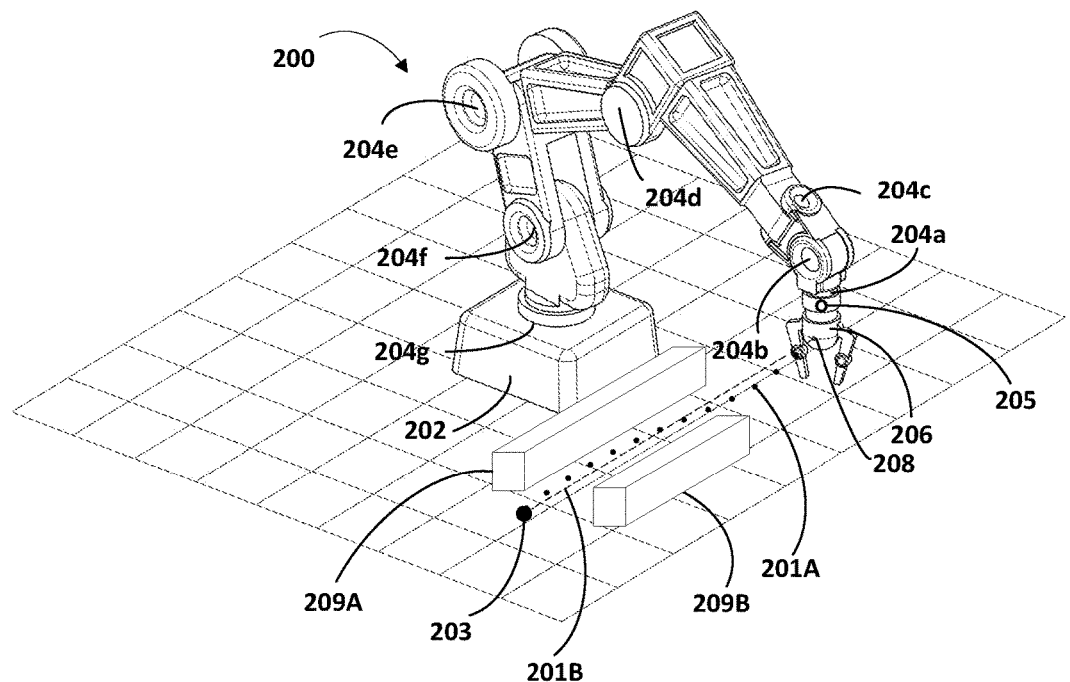
FIG. 1 illustrates an example robot and graphical representations of: (a) positions traversed by a reference point of an end effector of the robot to reach a target waypoint based on non-phase synchronized time-optimal trajectories of actuators of the robot; and (2) positions traversed by the reference point to reach the target waypoint based on phase synchronized trajectories of the actuators.

With reference to FIG. 1, one example is provided of a comparison of phase synchronized trajectories to time-optimal trajectories that are time-synchronized, but not phase-synchronized. FIG. 1 illustrates an example robot 200 (in a form often referred to as a "robot arm") that includes a base 202 and a plurality of actuators, seven of which are referenced in FIG. 2 with 204$a$-$g$ (it is understood that the actual "actuators" are "under" the exterior surfaces of robot 200 indicated by references 204$a$-$g$). Each of the actuators 204$a$-$g$ provides a degree of freedom of movement for the robot 200 and the motion states of the actuators 204$a$-$g$ dictate the motion state of the end effector 206. For example, the position of the end effector 206 in FIG. 1 is dictated by the positions of the actuators 204$a$-$g$ in FIG. 1. In some implementations, each of the actuators 204$a$-$g$ may be a servo motor that enables controllable rotation about a respective axis.

The actuators 204$a$-$g$ enable the end effector 206 to move with any one of a plurality of trajectories when moving a reference point 208 of the end effector 206 from a first position of a current motion state of the end effector 206 to a second position of a target motion state. In some implementations, the position of the end effector may be the position of a reference point of the end effector, such as reference point 208. In some implementations, the reference point of an end effector may be a center of mass of the end effector, and/or a point near where end effector attaches to other components of the robot, though this is not required.

Robot 200 may include other actuators in addition to actuators 204$a$-$g$, but those are not labeled in FIG. 1 for the sakes of clarity and brevity. As used herein, an "actuator" of a robot may refer to motors (e.g., servo motors), joints, shafts, gear trains, pumps (e.g., air or liquid), pistons, drives, or other components that may create and/or undergo propulsion, rotation, and/or motion. An actuator may optionally have an associated driver that receives control commands for driving the actuator and converts those control commands into one or more signals for driving the actuator.

Figure 3:
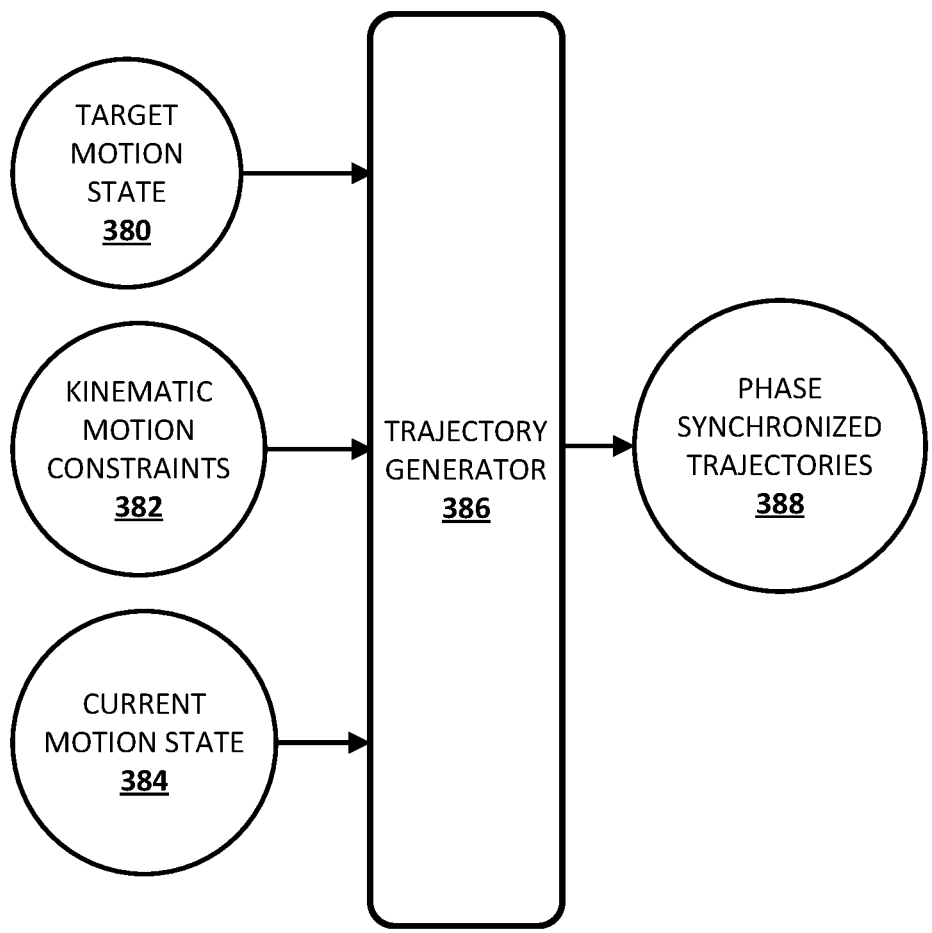
FIG. 3 illustrates an example of a trajectory generator generating phase synchronized trajectories based on a current motion state of actuators of the robot, a target motion state of the actuators, and kinematic motion constraints of the actuators.

As used herein, "end effector" may refer to a variety of tools that may be operated by robot 200 in order to accomplish various tasks. In FIGS. 1 and 3 herein, for example, end effector 206 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 206 may be removable, and various types of modular end effectors may be installed onto robot 200, depending on the circumstances.

In FIG. 1, segment 201A illustrates positions traversed by the reference point 208 to reach a target waypoint 203 based on time-optimal trajectories of the actuators 204$a$-$g$, where those trajectories are time synchronized but not phase synchronized. Segment 201B illustrates positions traversed by the reference point 208 to reach a target waypoint 203 based on phase synchronized trajectories of the actuators 204$a$-$g$. As illustrated in FIG. 1, segment 201B is a one-dimensional straight-line in Cartesian space, whereas segment 201A is multi-dimensional in Cartesian space.

One-dimensional straight-line movement of the reference point 208 may be desirable or necessary in many situations. For example, as appreciated when viewing FIG. 1, if reference point 208 traverses positions indicated by segment 201B, end effector 206 will avoid contact with obstacles 209A and 209B. However, if reference point 208 traverses positions indicated by segment 201A, end effector 206 will undesirably contact obstacles 209A and/or 209B at one or more of those positions. Accordingly, even though in some situations traversal of positions indicated by segment 201A may be more time-optimal than traversal of positions indicated by segment 201B (e.g., one or more actuators may operate at or closer to one or more of their kinematic constraints (e.g., jerk) when traversing 201A than when traversing 201B), traversal of positions indicated by segment 201B may be more desirable. In some implementations, a motion planner or other component may detect the obstacles 209A and/or 209B and request that a phase synchronized trajectory that achieves one-dimensional straight line movement be utilized in reaching the target waypoint 203. For example, the motion planner may provide a target motion state that indicates end effector 206 should transition from its current motion state to a motion state where reference point is positioned at waypoint 203 with the end effector 206 at zero velocity, and that it should transition with phase synchronized trajectories. In many implementations, the motion planner may provide multiple sequential waypoints to be achieved, such as one or more waypoints that are between waypoint 203 and the illustrated current position of the reference point 208.

One-dimensional straight-line movement of the reference point 208 may be desirable or necessary in additional and/or alternative situations. For example, in picking up objects with end effector 206 it may be desirable for reference point 208 to move in a straight-line. For instance, in picking up a full glass of water it may be desirable for the end effector 206 to move reference point 208 vertically straight up to reduce the chance of spilling the water. Also, for example, in placing objects with end effector 206 it may be desirable for the end effector 206 to move in a straight-line. For instance, in placing a tippable object on a surface it may be desirable to move reference point 208 vertically straight down to reduce the chance of the object tipping when it is placed on a surface.

Figure 2:
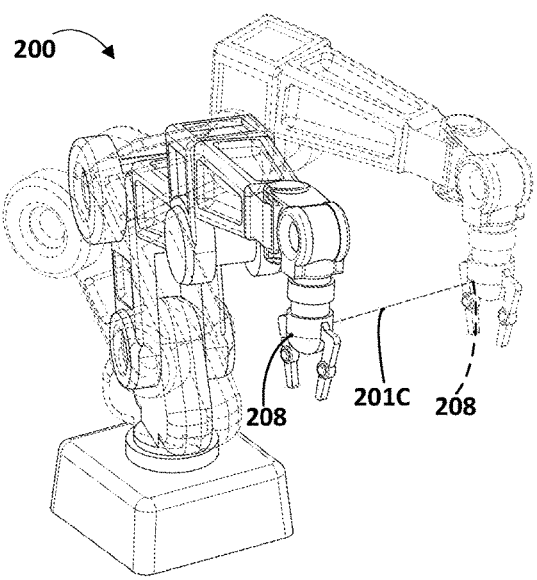
FIG. 2 illustrates the example robot of FIG. 1.

Segment 201C of FIG. 2 illustrates positions traversed by the reference point 208 of the robot 200 based on additional phase synchronized trajectories of the actuators. As illustrated in FIG. 2, segment 201C is also a one-dimensional straight line in Cartesian space. The numbering of various components of the robot 200 is omitted in FIG. 2 for the sake of simplifying the figure. FIG. 2 also illustrates a pose of the robot 200 at the beginning of the movement (illustrated in broken lines) and pose of the robot 200 at the end of the movement (illustrated in solid lines). It is understood that as reference point 208 traverses the positions indicated by segment 201C, robot 200 will strike a plurality of additional poses between the two illustrated poses.

Turning now to FIG. 3, an example of a trajectory generator 386 generating phase synchronized trajectories 388 is illustrated. The trajectory generator 386 generates the phase synchronized trajectories 388 based on a current motion state 384 of actuators of the robot, a target motion state 380 of the actuators, and kinematic motion constraints 382 of the actuators. The trajectory generator 386 may be implemented by one or more processors of a robot, such as robot 200.

The target motion state 380 defines a desired motion state to be reached by the actuators of a robot, such as robot 200. For example, the target motion state may define particular positions of the actuators and zero velocity, zero acceleration, etc. For instance, the target motion state may be a motion state where the positions of the actuators cause an end effector to be at a particular position and maintain that position. As another example, the target motion state may define particular positions of the actuators and non-zero velocities, accelerations, and/or jerks for one or more of the actuators. For instance, the target motion state may be a motion state that causes an end effector to be at a particular position and arrive at that position with a particular velocity.

Various techniques may be utilized to determine the target motion state. For example, the target motion state may be provided by a motion planner of the robot. Also, for example, the motion planner may provide a target motion state of an end effector, and the target motion state for the actuators may be determined based on the target motion state of the end effector. For instance, the motion planner may provide a target motion state of the end effector that is a waypoint in Cartesian space and the target motion states of the actuators in joint space determined based on applying that waypoint to a kinematic model of the robot (to determine positions of actuators that will cause a reference point of the end effector to be at that waypoint).

In some implementations, the target motion state for actuators may be based on inputted value(s), value(s) retrieved from hardware memory accessible to trajectory generator 386, and/or other values. For example, the target motion state may be determined based on a waypoint defined in response to a user providing input via one or more user interface input devices of a computing device. For instance, the computing device may generate a graphical user interface displaying an environment around a robot and the user may provide input via the graphical user interface to select a position in the environment to utilize as the waypoint. Also, for example, the target motion state may be determined based on a waypoint defined as part of a program or task being executed by the robot. For instance, the robot may be programmed to move a reference point of the robot from a current position to one or more waypoints upon occurrence of one or more events, such as upon the occurrence of certain output from one or more sensors of the robot. Also, for example, the target motion state may be determined based on a waypoint determined based on sensor data from one or more sensors of the robot. For instance, image data from a stereographic camera may be utilized to detect an object in a robot's environment and a waypoint determined to reach the object, or to avoid the object.

The current motion state 384 defines a current motion state of the actuators of a robot, such as robot 200. For example, when the robot is currently stationary, the current motion state may define particular positions of the actuators and zero velocity, zero acceleration, etc. Also, for example, when the robot is currently in motion, the current motion state may define particular positions of the actuators and non-zero velocities, accelerations, and/or jerks for one or more of the actuators.

The kinematic motion constraints 382 define constraints for each of the actuators. The kinematic motion constraints 382 may include, for example, minimum/maximum velocities, minimum/maximum positions, minimum/maximum accelerations, minimum/maximum jerks, and/or minimum/maximum jounces. In some implementations, the kinematic constraints may be determined in view of a dynamic model of the robot.

In some implementations, the trajectory generator 386 utilizes the target motion state 380, the kinematic motion constraints, and the current motion state 384 to generate a time-optimal trajectory for each of the actuators. The time-optimal trajectories time-optimally transfer a current motion state of the actuators to a target motion state of the actuators. In some of those implementations, the trajectory generator 386 first attempts to phase synchronize the time-optimal trajectories. If phase synchronization of the time-optimal trajectories is achievable, the trajectory generator 386 may utilize the phase synchronized time-optimal trajectories as phase synchronized trajectories 388. However, if phase synchronization of time-optimal trajectories is not achievable (e.g., it would violate one or more kinematic motion constraints), the trajectory generator 386 generates phase synchronized trajectories that are less time-optimal than the time-optimal trajectories and utilizes those as the phase synchronized trajectories 388. In some versions of those implementations, phase synchronized trajectories that are less time-optimal than the time-optimal trajectories may be generated and/or utilized in lieu of non-phase synchronized time-optimal trajectories only when a request and/or other signal(s) (e.g., from a motion planner) indicate that phase synchronization is desired or necessary.

In various implementations, the trajectory generator 386 generates phase synchronized trajectories 388 that are not time-optimal based on: time-scaling the time-optimal trajectory for a given one of the actuators of the robot to generate a time-scaled trajectory (i.e., time scaling the time-optimal trajectory with the largest execution time); phase-scaling the time-scaled trajectory for each of the other actuators of the robot based on phase scale factors of the other actuators to generate phase synchronized trajectories of the other actuators; and using the time-scaled trajectory of the actuator and the phase synchronized trajectories of the other actuators as the phase synchronized trajectories.

The phase synchronized trajectories 388 may be provided for operation of the actuators of the robot based on the phase synchronized trajectories 388.

In some implementations, the trajectory generator 386 is a real-time trajectory generator and may generate and/or provide the phase synchronized trajectories 388 within a control cycle of the robot on which it is implemented.

The trajectory generator 386 may generate new phase synchronized trajectories 388 in response to receiving a new target motion state 380. In some of those implementations, receiving the new target motion state may be in response to a sensor event of the robot during operation of the actuators of the robot based on the most recently generated phase synchronized trajectories 388. As one example, the sensor event may indicate an obstacle that was not present during the generation of the most recently generated phase synchronized trajectories.

Figure 4A:
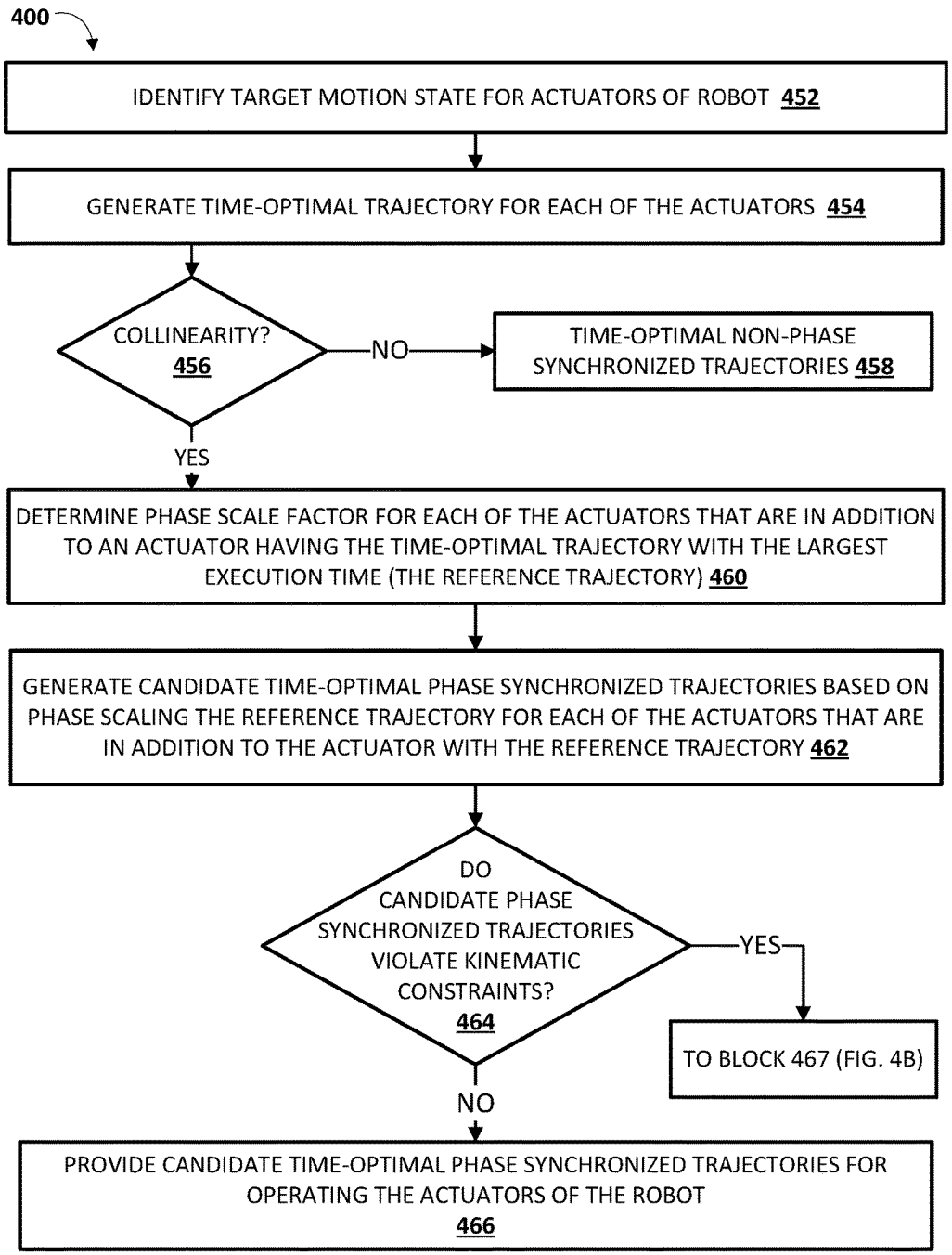
FIGS. 4A and 4B depict a flow chart illustrating an example method of some implementations disclosed herein.
Figure 4B:
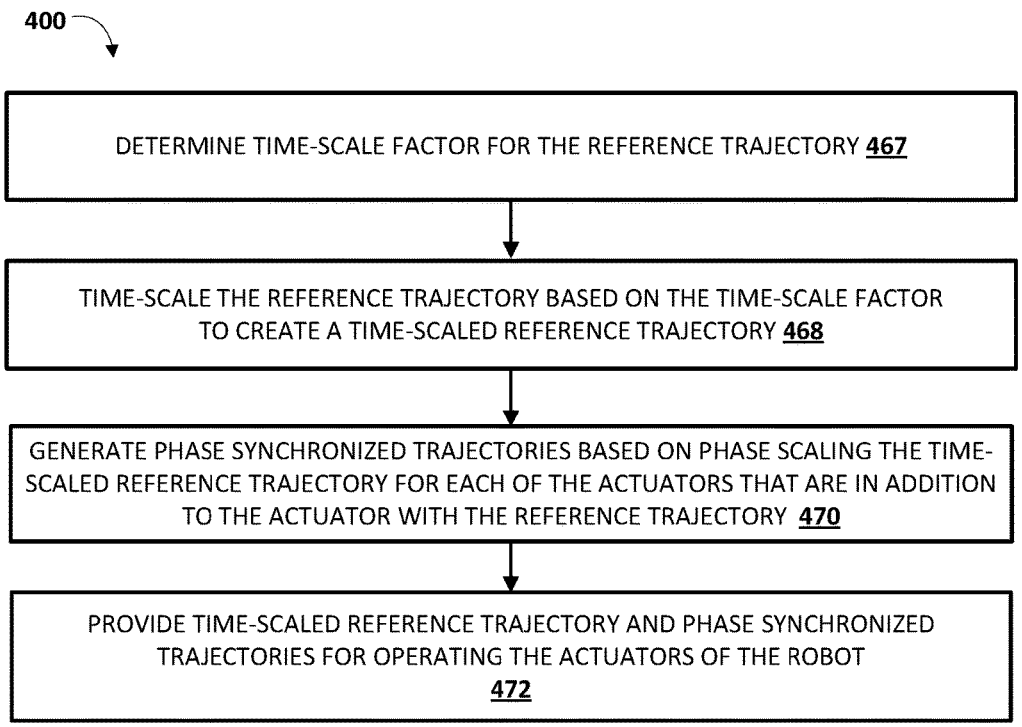

Turning now to FIGS. 4A and 4B, additional description is provided of various implementations of generating phase synchronized trajectories by trajectory generator 386 and/or other component(s). FIGS. 4A and 4B depict a flow chart illustrating an example method 400 of some implementations disclosed herein. For convenience, the operations of the flow chart are described with reference to a system that performs the operations. This system may include trajectory generator 386, which may be implemented by one or more components of a robot, such as a processor and/or robot control system of robot 200, robot 500 and/or other robot; and/or may be implemented by one or more computing device(s) that are separate from a robot, such as computing device 610. Moreover, while operations of method 400 are shown in a particular order, this is not meant to be limiting. One or more operations may be reordered, omitted or added.

At block 452, the system identifies a target motion state for actuators of a robot. The target motion state may define, for example, particular positions of the actuators and zero velocity, zero acceleration, etc.—or may define particular positions and non-zero velocities, accelerations, etc. for one or more of the actuators.

At block 454, the system generates a time-optimal trajectory for each of the actuators. In other words, the system computes the time-optimal trajectories for each joint independently. In some implementations, the system generates the time-optimal trajectories based on: the target motion state of block 452, a current motion state of actuators of the robot, and kinematic motion constraints of the actuators. For example, to generate the time-optimal trajectory for a given actuator, the system may select, from a finite group of motion profiles, a motion profile that transfers the given actuator from its current motion state to its target motion state within the shortest time possible. In some implementations, the system selects a motion profile based on decision trees. Each of the motion profiles of the finite group may include a velocity profile, an acceleration profile, and/or a jerk profile. Accordingly, the time-optimal trajectory generated based on a selected motion profile may define motion states (e.g., positions, velocities, accelerations, jerks over time) for the given actuator.

At block 456, the system determines whether there is collinearity between the target motion state of block 452 and the current motion state of the actuators of the robot. If the target motion state of block 452 and the current motion state of the actuators are not collinear, a phase synchronized trajectory is not possible. Accordingly, if the system determines at block 456 that the target motion state of block 452 and the current motion state of the actuators are not collinear, the system proceeds to block 458 where time-optimal non-phase synchronized trajectories are generated and provided for operating the actuators of the robot.

If the system determines at block 456 that the target motion state of block 452 and the current motion state of the actuators are collinear, the system proceeds to block 460.

At block 460, the system determines a phase scale factor for each of the actuators that are in addition to an actuator having a reference trajectory, where the reference trajectory is the time-optimal trajectory with the largest execution time. For example, the system may determine the reference trajectory with the largest execution time based on determining the minimum execution time for each of the time-optimal trajectories, and selecting the time-optimal trajectory with the largest minimum execution time. For instance, time-optimal trajectories may be determined for each of seven separate actuators, minimum execution times determined for each, and the time-optimal trajectory, for one of the actuators, with the largest minimum execution time may be selected as the reference trajectory.

The system may then determine a phase scale factor for each of the actuators that are in addition to the actuator with the reference trajectory. The phase scale factor for each of the actuators that are in addition to the actuator with the reference trajectory are determined such that when the reference trajectory is phase-scaled, the target motion state is achieved. In some implementations, the phase scale factor for each actuator that is in addition to the actuator with the reference trajectory may be determined as follows:

(a) If the difference between the target position vector (all actuators included) of the target motion state and the current position vector (all actuators included) of the current motion state is non-zero, then the phase scale factor for a given actuator is:

$$\text{(target position of the given actuator} - \text{current position of the give actuator)} \Big/ \sqrt{\sum_{i=1}^{N} (\text{target position of actuator } i - \text{current position of actuator } i)^2}$$

(b) Else, if the velocity vector (all actuators included) of the current motion state is non-zero, then the phase scale factor for the given actuator is:

$$\text{(current velocity of the given actuator)} \Big/ \sqrt{\sum_{i=1}^{n} \text{(current velocity of actuator } i)^2}$$

(c) Else, if the acceleration vector (all actuators included) of the current motion state is non-zero, then the phase scale factor for the given actuator is:

$$\text{(current acceleration of the given actuator)} \Big/ \sqrt{\sum_{i=1}^{n} \text{(current acceleration of actuator } i)^2}$$

(d) Else, if the velocity vector (all actuators included) of the target motion state is non-zero, then the phase scale factor for the given actuator is:

$$\text{(target velocity of the given actuator)} \Big/ \sqrt{\sum_{i=1}^{n} \text{(target velocity of actuator } i)^2}$$

(e) Else, if the acceleration vector (all actuators included) of the target motion state is non-zero, then the phase scale factor for the given actuator is:

$$\text{(target acceleration of the given actuator)} \Big/ \sqrt{\sum_{i=1}^{n} \text{(target acceleration of actuator } i)^2}$$

At block 462, the system generates candidate time-optimal phase synchronized trajectories based on phase scaling the reference trajectory for each of the actuators that are in addition to the actuator having the reference trajectory. The reference trajectory is phase scaled for each of the actuators based on the phase scale factors for the actuators determined in block 460.

At block 464, the system determines whether one or more of the candidate time-optimal phase synchronized trajectories generated at block 458 violate one or more kinematic motion constraints. For example, in many situations phase scaling the motion profile of a time-optimal trajectory for other actuators, to generated candidate time-optimal phase synchronized trajectories that are phase synchronized to the time-optimal trajectory, may cause one or more kinematic motion constraints of one or more of the other actuators to be violated. For instance, since a time-optimal trajectory may operate at maximum/minimum jerk, attempting to phase scale the time-optimal trajectory in some situations may cause velocity and/or acceleration constraints of another actuator associated with at least one candidate time-optimal phase scaled trajectory to be violated—if that actuator were operated with the candidate time-optimal phase scaled trajectory.

If at block 464 it is determined one or more of the candidate time-optimal phase synchronized trajectories do not violate one or more kinematic motion constraints, the system proceeds to block 466. At block 466 the system provides the candidate time-optimal phase synchronized trajectories of the actuators for operating the actuators of the robot. In particular, the reference trajectory is utilized to operate its corresponding actuator and the candidate time-optimal phase synchronized trajectories utilized to operate their corresponding actuators. Accordingly, in such a situation the actuators of the robot will be operated in a manner to cause movement that is both in a straight-line and time-optimal.

If at block 464 it is determined one or more of the candidate time-optimal candidate phase synchronized trajectories do violate one or more kinematic motion constraints, the system proceeds to block 467 (FIG. 4B). In blocks 467, 468, and 470 described below, the system determines trajectories for the actuators that are phase synchronized, but that are not time-optimal. In other words, the trajectories will be phase synchronized, but will have a greater execution time than an execution time for time-optimal trajectories that are time synchronized, but not phase synchronized. In some implementations, the phase synchronized trajectories may be generated so as to minimize the execution time while avoiding violation of kinematic motion constraints (with the understanding that the execution time will still be greater than that of time-optimal non-phase synchronized trajectories).

At block 467, the system determines a time-scale factor for the reference trajectory such that the phase scaled versions of the time-scaled versions of the time-scaled reference trajectory for each actuator satisfies their kinematic constraints. As described above with respect to block 460, the system may determine the reference trajectory with the largest execution time based on determining the minimum execution time for each of the time-optimal trajectories, and selecting the time-optimal trajectory with the largest minimum execution time as the reference trajectory.

In some implementations, the system determines the time-scale factor for time-scaling the reference trajectory based on at least one property of the violation of the kinematic constraint determined at block 464. In some of those implementations, the time-scale factor is based on which of one or more of the kinematic constraints was violated (e.g., velocity, torque, and/or jerk) and/or is based on a magnitude of the violation. For example, in some implementations, the time-scale factor for a violation of a given magnitude of a velocity kinematic constraint of may be different than the time-scale factor for a violation of the given magnitude of a jerk kinematic constraint. Also, for example, the time-scale factor for a violation of a first magnitude of a velocity kinematic constraint may be different than a violation of a second magnitude of the velocity kinematic constraint. In some implementations, mappings (e.g., in hardware memory) between various time-scale factors and corresponding properties of violations may be utilized to determine a time-scale factor for a given violation.

In some implementations, determining the time-scale factor based on at least one property of the violation of the kinematic constraint may include the following:

(a) Determining a time-scale factor based on each jerk limit (if any) that is violated based on:

$$\sqrt[3]{\frac{\text{phase scaled jerk limit of violation}}{\text{original jerk limit}}}$$

(b) Determining a time-scale factor based on each acceleration limit (if any) that is violated based on:

$$\sqrt[2]{\frac{\text{phase scaled acceleration limit of violation}}{\text{original acceleration limit}}}$$

(c) Determining a time-scale factor based on each velocity limit (if any) that is violated based on:

$$\sqrt{\frac{\text{phase scaled velocity limit of violation}}{\text{original velocity limit}}}$$

(d) Selecting the largest time-scale factor from (a)-(c). In some implementations, only one limit will be violated and that will be selected since it is by default the largest. In other implementations, multiple limits may be violated (e.g., one or more may be violated for jerk, one or more violated for acceleration, and/or one or more violated for velocity)—and the largest time scale factor for the multiple violations may be selected.

At block 468, the system time-scales the reference trajectory (the time-optimal trajectory with the largest execution time) based on the time-scale factor to create a time-scaled reference trajectory. The system time-scales the reference trajectory so as to increase the execution time of that trajectory while correspondingly decreasing the magnitude of the motion profile of the reference trajectory. For example, increasing the execution time by 10 milliseconds may cause less of a decrease in the magnitude of the motion profile of the trajectory than increasing the execution time by 20 milliseconds. In some implementations, the reference trajectory is time-scaled so that phase synchronized trajectories generated in block 472 (described below) will not violate any kinematic motion constraints. In some of those implementations, the reference trajectory is time-scaled so that one or more of the phase synchronized trajectories generated in block 470 (described below) will approach or arrive at one or more of the kinematic motion constraints, but not violate any of those kinematic motion constraints.

At block 470, the system generates, for each of the actuators that are in addition to the one with the reference trajectory (with the largest execution time), a phase synchronized trajectory based on phase scaling the time-scaled reference trajectory for each of the actuators. The time-scaled reference trajectory is phase scaled for each of the actuators based on the phase scale factors for the actuators determined at block 460.

At block 472, the system provides the time-scaled reference trajectory and the phase synchronized trajectories for operating the actuators of the robot. In particular, the time-scaled reference trajectory is utilized to operate its corresponding actuator and the phase synchronized trajectories utilized to operate their corresponding actuators. Accordingly, in such a situation the actuators of the robot will be operated in a manner to cause movement that is in a straight-line, but that is not time-optimal. In some implementations, the system may generate control commands based on the time-scaled reference trajectory and the phase synchronized trajectories—and the system may provide the control commands to drivers associated with the actuators for operating of the actuators.

In some implementations, the method 400 may restart at block 452 in response to receiving a new target motion state.

For example, the method 400 may restart at block 452 in response to an overriding new target motion state being identified.

Figure 5:
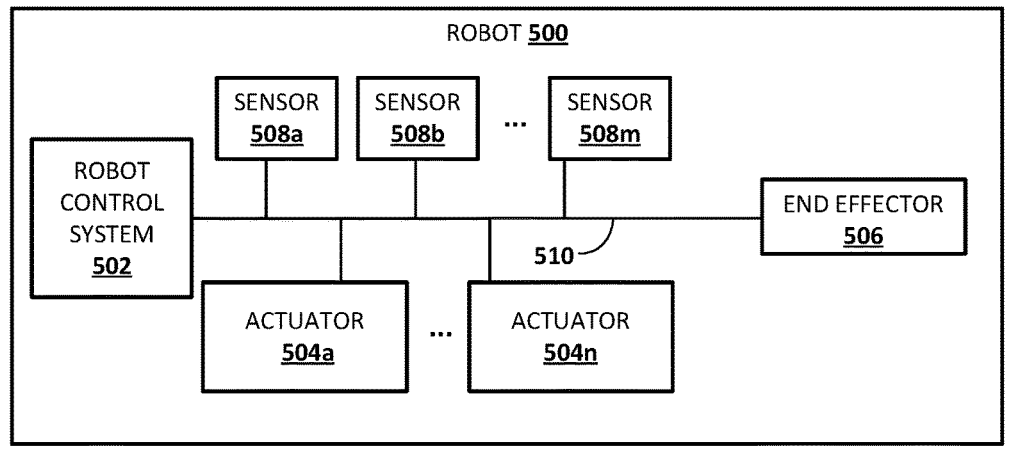
FIG. 5 schematically depicts an example architecture of a robot.

FIG. 5 schematically illustrates an example architecture of a robot 500. Robot 500 may take various forms, including but not limited to a robot arm similar to robot 200 described above, a humanoid form, an animal form, a wheeled device, a submersible vehicle, an unmanned aerial vehicle ("UAV"), and so forth.

Robot 500 includes a robot control system 502, actuators 504a-n, sensors 508a-m, and end effector 506. In various implementations, robot control system 502 may be operably coupled with one or more actuators 504a-n and/or one or more sensors 508a-m, e.g., via one or more buses 510. Sensors 508a-m may take various forms, including but not limited to position sensors, torque sensors, force sensors, light sensors, pressure sensors, pressure wave sensors (e.g., microphones), proximity sensors, accelerometers, gyroscopes, thermometers, barometers, and so forth. While sensors 508a-m are depicted as being integral with robot 500, this is not meant to be limiting. In some implementations, one or more sensors 508a-m may be located external to robot 500, e.g., as standalone units.

The robot control system 502 may be implemented in one or more processors, such as a CPU, GPU, and/or other controller(s) of the robot 500. In some implementations, the robot 500 may comprise a "brain box" that may include all or aspects of the control system 502. For example, the brain box may provide real time bursts of data to the actuators 504a-n, with each of the real time bursts comprising a set of one or more control commands that dictate, inter alia, the trajectory for each of one or more of the actuators 504a-n. In some implementations, the robot control system 502 may perform one or more aspects of method 400 described herein.

The control commands provided by robot control system 502 to actuators 504a-n include commands that direct the actuators 504a-n to move to traverse one or more trajectories generated according to techniques described herein. Moreover, the robot control system 502 may optionally determine current motion states of one or more actuators 504a-n and/or end effector 506 based on sensor feedback from one or more of the sensors 508a-m to generate trajectories in view of the motion states according to techniques described herein.

Although control system 502 is illustrated in FIG. 5 as an integral part of the robot 500, in some implementations, all or aspects of the control system 502 may be implemented in a component that is separate from, but in communication with, robot 500. For example, all or aspects of control system 502 may be implemented on one or more computing devices that are in wired and/or wireless communication with the robot 500, such as computing device 502.

Figure 6:
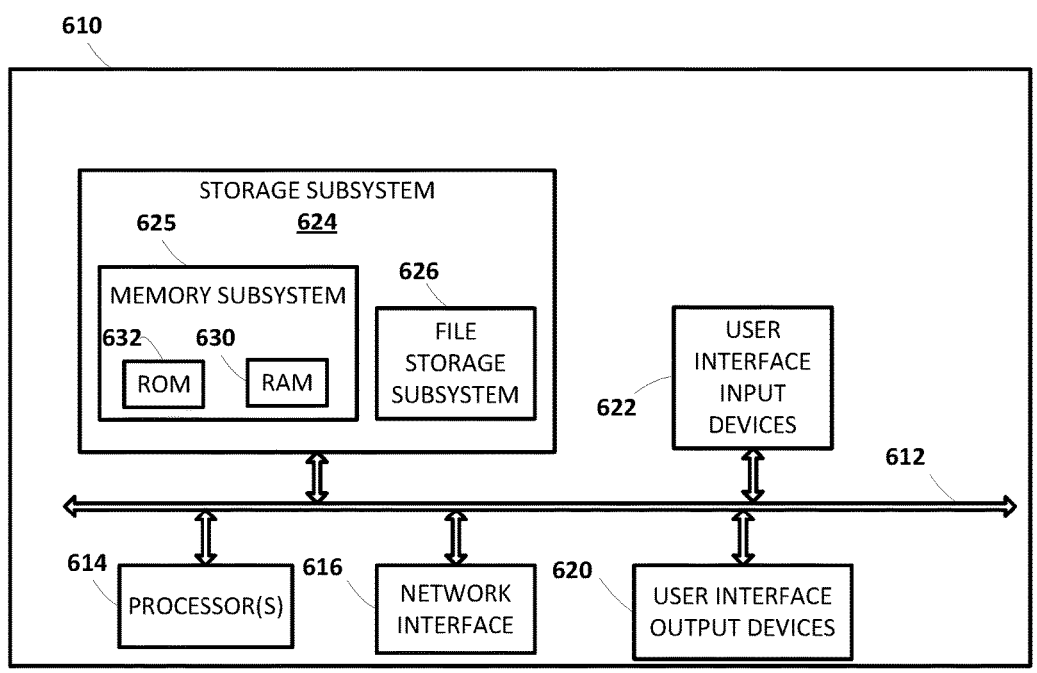
FIG. 6 schematically depicts an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 4A and 4B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors of a robot, comprising:

identifying a target motion state of a plurality of actuators of the robot;

generating time-optimal trajectories for the plurality of actuators, wherein each of the time-optimal trajectories is for a corresponding one of the plurality of actuators, and wherein each of the time-optimal trajectories defines corresponding motion states for a corresponding one of the plurality of actuators, wherein the time-optimal trajectories, if implemented, time-optimally transfer a current motion state of the plurality of actuators to the target motion state of the plurality of actuators, wherein generating the time-optimal trajectories is based on: the current motion state of the plurality of actuators, the target motion state of the plurality of actuators, and kinematic motion constraints of the plurality of actuators, and wherein time-optimally is optimal with respect to transferring the current motion state to the target motion state in the shortest time possible;

determining whether time-optimal phase synchronization of the time-optimal trajectories is not achievable;

in response to determining that the time-optimal phase synchronization is not achievable, time-scaling a particular time-optimal trajectory of the time optimal trajectories, to create a time-scaled trajectory, wherein the particular time-optimal trajectory is for a particular actuator of the plurality of actuators and is time-scaled based on having the largest execution time;

determining, for each of the plurality of actuators that are in addition to the particular actuator having the particular time-optimal trajectory with the largest execution time, a phase scale factor;

generating phase synchronized trajectories for the plurality of actuators that are in addition to the particular actuator having the time-optimal trajectory with the largest execution time, wherein a corresponding one of the phase synchronized trajectories is generated for each of the plurality of actuators that are in addition to the particular actuator having the particular time-optimal trajectory with the largest execution time, and wherein generating a phase synchronized trajectory, of the phase synchronized trajectories, for a given actuator, of the plurality of actuators that are in addition to the particular actuator, is based on phase-scaling the particular time-scaled trajectory for the given actuator based on the phase scale factor for the given actuator that is in addition to the particular actuator; and operating the particular actuator using the particular time-scaled trajectory and operating the plurality of actuators that are in addition to the particular actuator using the phase synchronized trajectories.

2. The method of claim 1, wherein determining whether the time-optimal phase synchronization is achievable comprises:
determining that the time-optimal phase synchronization is not achievable based on determining that the time-optimal trajectories cannot be phase synchronized while maintaining the time-optimality of the time-optimal trajectories and while avoiding violation of any of the kinematic motion constraints.

3. The method of claim 2, wherein determining that the time-optimal trajectories cannot be phase synchronized while maintaining the time-optimality of the time-optimal trajectories and while avoiding violation of any of the kinematic motion constraints comprises:
generating, for at least the given actuator that is in addition to the particular actuator having the particular time-optimal trajectory with the largest execution time, a candidate phase synchronized trajectory based on the particular time-optimal trajectory with the largest execution time and based on the phase scale factor;
determining that the candidate phase synchronized trajectory includes a violation of at least one of the kinematic motion constraints.

4. The method of claim 3, wherein time-scaling the particular time-optimal trajectory with the largest execution time comprises:
determining a time-scale factor based on at least one property of the violation.

5. The method of claim 4, wherein the at least one property includes a magnitude of the violation.

6. The method of claim 4, wherein the at least one property includes which of the kinematic motion constraints was violated.

7. The method of claim 1, wherein operating the particular actuator using the particular time-scaled trajectory and operating the plurality of actuators that are in addition to the particular actuator using the phase synchronized trajectories comprises:
generating control commands based on the particular time-scaled trajectory and the phase synchronized trajectories;
providing the control commands to drivers associated with the plurality of actuators for operating of the plurality of actuators of the robot based on the particular time-scaled trajectory and the phase synchronized trajectories.

8. The method of claim 1, further comprising:
receiving a request for phase synchronization in reaching the target motion state of the plurality of actuators;
wherein time-scaling the particular time-optimal trajectory with the largest execution time to create the time-scaled trajectory is further in response to identifying the request for phase synchronization.

9. The method of claim 8, wherein the target motion state is received from a motion planner of the robot and the request for phase synchronization is received from the motion planner.

10. A method implemented by one or more processors of a robot, comprising:
identifying, at a first time, a first target motion state of actuators of the robot;
generating first time-optimal trajectories for the actuators, wherein each of the first time-optimal trajectories is for a corresponding one of the actuators, and wherein the first time-optimal trajectories time-optimally transfer, with respect to shortest time, a motion state of the actuators at the first time to the first target motion state of the actuators;
generating time-optimal phase synchronized trajectories that are a time-optimal phase synchronization of the time-optimal trajectories;
using the time-optimal phase synchronized trajectories to operate the plurality of actuators of the robot in reaching the first target motion state from the motion state of the actuators at the first time;
identifying, at a second time, a second target motion state of the actuators of the robot;
generating second time-optimal trajectories for the actuators, wherein each of the second time-optimal trajectories is for a corresponding one of the actuators, and wherein the second time-optimal trajectories time-optimally transfer a current motion state of the actuators at the second time to the second target motion state of the actuators;
determining whether time-optimal phase synchronization for the second time-optimal trajectories is achievable;
in response to determining that time-optimal phase synchronization for the second time-optimal trajectories is not achievable, generating phase synchronized trajectories for the actuators that are less time-optimal than the second time-optimal trajectories; and
using the phase synchronized trajectories to operate the plurality of actuators of the robot in reaching the second target motion state from the current motion state of the actuators at the second time.

11. The method of claim 10, further comprising:
receiving a request for phase synchronization in reaching the second target motion state of the actuators;
wherein generating phase synchronized trajectories for the actuators that are less time-optimal than the second time-optimal trajectories is further in response to identifying the request for phase synchronization.

12. The method of claim 11, wherein the second target motion state is received from a motion planner of the robot and the request for phase synchronization is received from the motion planner.

13. The method of claim 10, wherein generating phase synchronized trajectories for the actuators that are less time-optimal than the second time-optimal trajectories comprises:
time-scaling a particular second time-optimal trajectory, of the second time-optimal trajectories, to create a time-scaled trajectory, wherein the particular second time-optimal trajectory has the largest execution time of the second time-optimal trajectories;
using the time-scaled trajectory as a particular phase synchronized trajectory for a corresponding particular actuator of the actuators, wherein the particular phase synchronized trajectory is one of the phase synchronized trajectories; and
generating, for each of the actuators that are in addition to the particular actuator, corresponding ones of the phase synchronized trajectories based on phase scaling the time-scaled trajectory to the actuators that are in addition to the particular actuator based on phase scale factors for the actuators that are in addition to the particular actuator.

14. The method of claim 10, wherein determining whether the time-optimal phase synchronization for the second time-optimal trajectories is achievable comprises:

determining that the time-optimal phase synchronization for the second time-optimal trajectories is not achievable based on determining that the second time-optimal trajectories cannot be phase synchronized while maintaining the time-optimality of the second time-optimal trajectories and while avoiding violation of any kinematic motion constraints of the actuators.

15. A robot comprising:

a plurality of actuators;

one or more processors configured to:

identify a target motion state of the actuators of the robot;

generate time-optimal trajectories for the plurality of actuators, wherein each of the time-optimal trajectories is for a corresponding one of the plurality of actuators, and wherein each of the time-optimal trajectories defines corresponding motion states for a corresponding one of the plurality of actuators, wherein the time-optimal trajectories, if implemented, time-optimally transfer a current motion state of the plurality of actuators to the target motion state of the plurality of actuators, wherein generating the time-optimal trajectories is based on: the current motion state of the plurality of actuators, the target motion state of the plurality of actuators, and kinematic motion constraints of the plurality of actuators, and wherein time-optimally is optimal with respect to transferring the current motion state to the target motion state in the shortest time possible;

determine whether time-optimal phase synchronization of the time-optimal trajectories is not achievable;

in response to determining that the time-optimal phase synchronization is not achievable, time-scale a particular time-optimal trajectory of the time optimal trajectories, to create a time-scaled trajectory, wherein the particular time-optimal trajectory is for a particular actuator of the plurality of actuators and is time-scaled based on having the largest execution time to create a time;

determine, for each of the plurality of actuators that are in addition to the particular actuator having the particular time-optimal trajectory with the largest execution time, a phase scale factor;

generate phase synchronized trajectories for the plurality of actuators that are in addition to the particular actuator having the time-optimal trajectory with the largest execution time, wherein a corresponding one of the phase synchronized trajectories is generated for each of the plurality of actuators that are in addition to the particular actuator having the particular time-optimal trajectory with the largest execution time, and wherein generating a phase synchronized trajectory, of the phase synchronized trajectories, for a given actuator, of the plurality of actuators that are in addition to the particular actuator, is based on phase-scaling the particular time-scaled trajectory for the given actuator based on the phase scale factor for the given actuator that is in addition to the particular actuator; and the particular actuator using the particular time-scaled trajectory and operating the plurality of actuators that are in addition to the particular actuator using the phase synchronized trajectories.

* * * * *